(12) United States Patent
Zhang et al.

(10) Patent No.: US 9,377,834 B2
(45) Date of Patent: Jun. 28, 2016

(54) ADJUSTING WORKING FREQUENCY OF A PROCESSOR BASED ON MONITORED IDLE TIME

(71) Applicant: Huawei Technologies Co., Ltd., Shenzhen (CN)

(72) Inventors: He Zhang, Shanghai (CN); Xiao Xiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 411 days.

(21) Appl. No.: 13/870,570

(22) Filed: Apr. 25, 2013

(65) Prior Publication Data

US 2013/0290754 A1 Oct. 31, 2013

(30) Foreign Application Priority Data

Apr. 26, 2012 (CN) .......................... 2012 1 0126359

(51) Int. Cl.
*G06F 1/32* (2006.01)
(52) U.S. Cl.
CPC .............. *G06F 1/3206* (2013.01); *G06F 1/324* (2013.01); *Y02B 60/1217* (2013.01); *Y02B 60/32* (2013.01)
(58) Field of Classification Search
CPC ...... G06F 1/3206; G06F 1/324; G06F 1/3203
See application file for complete search history.

(56) References Cited

U.S. PATENT DOCUMENTS

| | | | |
|---|---|---|---|
| 4,624,685 A | | 11/1986 | Lueckenotte et al. |
| 5,058,033 A | * | 10/1991 | Bonissone et al. ............... 706/52 |
| 5,913,068 A | * | 6/1999 | Matoba ......................... 713/322 |
| 7,870,407 B2 | * | 1/2011 | Branover et al. ............. 713/323 |
| 2004/0019456 A1 | * | 1/2004 | Circenis ........................ 702/178 |
| 2004/0048587 A1 | | 3/2004 | Diao et al. |
| 2006/0047987 A1 | * | 3/2006 | Prabhakaran et al. ........ 713/322 |
| 2006/0212247 A1 | * | 9/2006 | Shimoyama et al. ........... 702/89 |
| 2009/0150695 A1 | * | 6/2009 | Song et al. ..................... 713/323 |
| 2009/0204830 A1 | * | 8/2009 | Frid ...................... G06F 1/3203 713/322 |
| 2009/0213125 A1 | * | 8/2009 | Shibasaki ...................... 345/501 |
| 2009/0235105 A1 | * | 9/2009 | Branover et al. ............. 713/330 |
| 2010/0094572 A1 | * | 4/2010 | Chase et al. ..................... 702/57 |
| 2010/0313046 A1 | * | 12/2010 | Mendes-Carvalho et al. ............................ 713/320 |

(Continued)

FOREIGN PATENT DOCUMENTS

CN 1350374 A 5/2002
CN 1534482 A 10/2004

(Continued)

*Primary Examiner* — Thomas Lee
*Assistant Examiner* — Santosh R Poudel
(74) *Attorney, Agent, or Firm* — Brinks Gilson & Lione

(57) ABSTRACT

Embodiments of the present invention provide a load monitoring apparatus and method. The apparatus includes: an operation unit, configured to determine indication information for indicating a working state of each processing module in the operation unit; a working state unit, configured to receive the indication information from the operation unit, and determine load amount information in a current monitoring period according to the indication information, where the load amount information is used for indicating a load amount state of the operation unit in the current monitoring period; and a load monitoring unit, configured to receive the load amount information from the working state unit and record the load amount information, and send the load amount information to a system controller, so that the system controller adjusts a working frequency of the operation unit according to the load amount information.

16 Claims, 4 Drawing Sheets

(56) References Cited

U.S. PATENT DOCUMENTS

2011/0035613 A1* 2/2011 Rancurel et al. .............. 713/323
2012/0233488 A1* 9/2012 Burchard .............. G06F 1/3228
                                                              713/500

FOREIGN PATENT DOCUMENTS

| | | |
|---|---|---|
| CN | 101067797 A | 11/2007 |
| CN | 201440264 U | 4/2010 |
| JP | 2004220221 A | 8/2004 |

* cited by examiner

ADJUSTING WORKING FREQUENCY OF A PROCESSOR BASED ON MONITORED IDLE TIME

CROSS-REFERENCE TO RELATED APPLICATION

This application claims priority to Chinese Patent Application No. 201210126359.4, filed on Apr. 26, 2012, which is hereby incorporated by reference in its entirety.

TECHNICAL FIELD

The present invention relates to the field of information technologies, and in particular, to a load monitoring apparatus and method.

BACKGROUND

With the continuous development of information technologies, performance of a processor, for example, a graphic process unit (Graphic Process Unit, GPU), becomes better and better, which synchronously causes that dynamic power consumption of the processor increases in multiple. To reduce the dynamic power consumption, it is generally required to obtain a load state of the processor. In the prior art, an underlying drive of the processor, in a software level, monitors the number of current tasks of the processor or predicts the number of future tasks of the processor, and estimates a load of the processor by analyzing the number of tasks.

Because a service of the processor is generally completed jointly by software and hardware of the processor, the underlying drive of the processor generally cannot monitor how busy the hardware is, and can only estimate the load of the processor, which causes poor accuracy in monitoring the load. Moreover, because the processor needs to consume resources to analyze how busy the service of the processor is, additional consumption is caused to the processor.

SUMMARY

Embodiments of the present invention provide a load monitoring apparatus and method, which can accurately reflect a load amount state and reduce resource consumption.

In one aspect, a load monitoring apparatus is provided and includes: an operation unit, configured to determine indication information for indicating a working state of each processing module in the operation unit; a working state unit, configured to receive the indication information from the operation unit, and determine load amount information in a current monitoring period according to the indication information, where the load amount information is used for indicating a load amount state of the operation unit in the current monitoring period; and a load monitoring unit, configured to receive the load amount information from the working state unit and record the load amount information, and send the load amount information to a system controller, so that the system controller adjusts a working frequency of the operation unit according to the load amount information.

In another aspect, a load monitoring method is provided and includes: determining, by an operation unit, indication information for indicating a working state of each processing module in the operation unit; receiving, by a working state unit, the indication information from the operation unit; and determining, by the working state unit, load amount information in a current monitoring period according to the indication information, where the load amount information is used for indicating a load amount state of the operation unit in the current monitoring period; receiving, by a load monitoring unit, the load amount information from the working state unit and recording the load amount information, and sending, by the load monitoring unit, the load amount information to a system controller, so that the system controller adjusts a working frequency of the operation unit according to the load amount information.

In the embodiments of the present invention, the working state unit determines the load amount information in the current monitoring period according to the working state of each processing module in the operation unit, which, compared with the prior art in which a load amount is monitored through software, can accurately reflect the load amount state and reduce the resource consumption.

BRIEF DESCRIPTION OF DRAWINGS

To describe the technical solutions in the embodiments of the present invention more clearly, the following briefly introduces accompanying drawings required for describing the embodiments of the present invention. Apparently, the accompanying drawings in the following description are merely some embodiments of the present invention, and persons of ordinary skill in the art may further obtain other drawings according to the accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
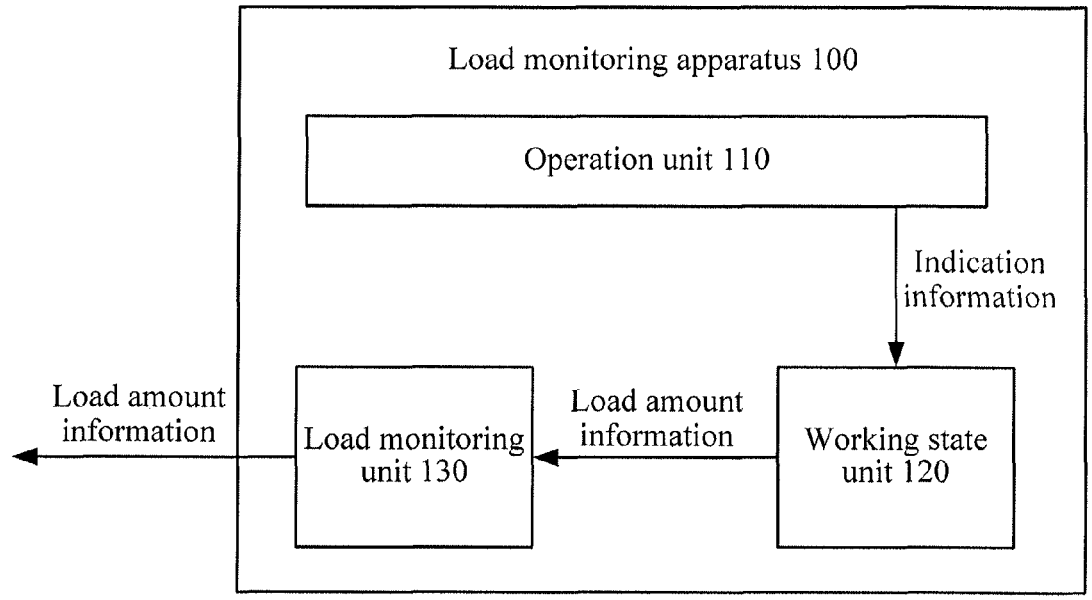
FIG. 1 is a schematic block diagram of a load monitoring apparatus according to an embodiment of the present invention.

FIG. 1 is a schematic block diagram of a load monitoring apparatus according to an embodiment of the present invention.

The load monitoring apparatus in FIG. 1 includes an operation unit 110, a working state unit 120, and a load monitoring unit 130.

The operation unit 110 is configured to determine indication information for indicating a working state of each processing module in the operation unit. The working state unit 120 is configured to receive the indication information from the operation unit 110, and determine load amount information in a current monitoring period according to the indication information, where the load amount information is used for indicating a load amount state of the operation unit 110 in the current monitoring period. The load monitoring unit 130 receives the load amount information from the working state unit 120 and records the load amount information, and sends the load amount information to a system controller, so that the system controller adjusts a working frequency of the operation unit 110 according to the load amount information.

In the embodiment of the present invention, the working state unit determines the load amount information in the current monitoring period according to the working state of each processing module in the operation unit, which, compared with the prior art in which a load amount is monitored through software, can accurately reflect the load amount state and reduce resource consumption.

In addition, in the embodiment of the present invention, the load monitoring unit sends the load amount information to the system controller, so that the system controller can adjust the working frequency of the operation unit according to the load amount state of the operation unit in the current monitoring period, thereby reducing dynamic power consumption of the operation unit.

It should be understood that, in the embodiment of the present invention, the operation unit 110 may be an operation part of a different processor, for example, may be an operation unit of a graphic process unit (Graphic Process Unit, GPU), and may also be an operation unit of another processor having a principle similar to that of the GPU, which is not limited in the embodiment of the present invention.

It should be further understood that, in the embodiment of the present invention, the operation unit 110, the working state unit 120, and the load monitoring unit 130 may be integrated together, and may also be distributed in an entire processing system, which is not limited in the embodiment of the present invention.

In the embodiment of the present invention, the operation unit 110 may send the indication information to the working state unit 120 in real time, so that the working state unit 120 may determine the load amount information in real time. Compared with the prior art in which the load amount is estimated through software, in the embodiment of the present invention, the load monitoring unit 130 can accurately monitor the load amount state of the operation unit 110 in the current monitoring period, namely, a load amount state of a processor in the current monitoring period.

In addition, in the prior art, to reduce dynamic power consumption of the processor, hardware monitors whether an internal module of the processor is busy, and a working clock of an idle module is disconnected. However, a case in which all modules are at a light load, but the processor still needs to work in a full frequency generally occurs, which causes that the dynamic power consumption is still high.

In the embodiment of the present invention, the load monitoring unit 130 sends the load amount information in the current monitoring period to the system controller, so that the system controller may dynamically adjust the working frequency of the operation unit 110 according to the load amount state of the operation unit 110 in the current monitoring period, thereby reducing the dynamic power consumption of the operation unit 110, namely, reducing the dynamic power consumption of the processor. For example, when the load drops by 50%, the working frequency may be reduced by 50%. The value example here is merely intended to help persons skilled in the art to better understand the embodiment of the present invention, instead of limiting the scope of the embodiment of the present invention.

Figure 2:
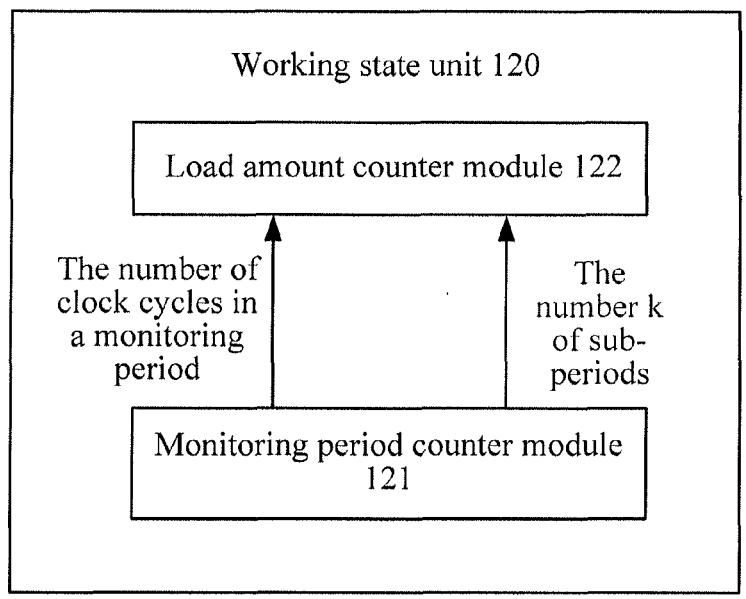
FIG. 2 is a schematic block diagram of an example of a working state unit in FIG. 1.

Optionally, as an embodiment, the working state unit 120 may determine a time length of the current monitoring period. FIG. 2 is a schematic block diagram of an example of a working state unit in FIG. 1. As shown in FIG. 2, the working state unit 120 may include a monitoring period counter module 121. The monitoring period counter module 121 may determine the number k of sub-periods in the current monitoring period and the number of clock cycles in the current monitoring period, where the current monitoring period is formed by k sub-periods, each sub-period has the same number of clock cycles, and k is a positive integer.

Generally, the number of clock cycles of each sub-period is predefined, so the time length of the current monitoring period depends on the number k of sub-periods in the current monitoring period. If the current monitoring period is too long, the load amount information is caused to lose real-timeliness. If the current monitoring period is too short, but the system controller needs a long time to read the load amount information and then adjust the operation unit 110, poor accuracy is caused. Therefore, in the embodiment of the present invention, the number k of sub-periods in a proper current monitoring period may be selected according to a performance feature of an operation unit in a different processor, which can flexibly adjust the length of the current monitoring period, and can also improve accuracy in monitoring the load amount state of the operation unit 110.

Optionally, as another embodiment, as shown in FIG. 2, the working state unit 120 may further include a load amount counter module 122. The load amount counter module 122 may determine a load amount of the operation unit 110 in the current monitoring period according to the indication information; and determine the load amount information according to the number k which is of sub-periods in the current monitoring period and is received from the monitoring period counter module 121 and the load amount of the operation unit 110 in the current monitoring period, where the load amount information includes a load amount of the operation unit 110 in a sub-period.

The load monitoring unit 130 needs to send the load amount information to the system controller through a bus, so if the load amount information is too large, resources are consumed. When the current monitoring period is formed by k sub-periods whose lengths are the same, after the load amount of the operation unit 110 in the current monitoring period is determined, the load amount of the operation unit 110 in the sub-period may be determined. In this way, the load amount information can be reduced, thereby saving resources.

Optionally, as another embodiment, the load amount counter module 122 may record, according to the indication information, the number of clock cycles where the operation unit 110 is in a busy state in the current monitoring period as the load amount of the operation unit 110.

The operation unit 110 has two states, the busy state and an idle state, and the load amount of the operation unit 110 may be obtained in a statistic manner. That is, the number of clock cycles where the operation unit 110 is in the busy state in the current monitoring period may be obtained and used as the load amount of the operation unit 110.

Optionally, as another embodiment, the load amount counter module 122 may receive the number of clock cycles in the current monitoring period from the monitoring period counter module 121; record the number of clock cycles where all processing modules are in the idle state in the current monitoring period as the number of clock cycles where the operation unit 110 is in the idle state; and according to the number of clock cycles where the operation unit 110 is in the idle state in the current monitoring period and the number of clock cycles in the current monitoring period, determine the number of clock cycles where the operation unit 110 is in the busy state in the current monitoring period.

The operation unit 110 includes at least one processing module, so a working state of the operation unit 110 is jointly determined by the working state of each processing module. If all processing modules are in the idle state in a same clock cycle, the operation unit 110 enters the idle state. Therefore, the number of clock cycles where all processing modules are in the idle state in the current monitoring period may be used as the number of clock cycles where the operation unit 110 is in the idle state. In this way, the number of clock cycles where the operation unit 110 is in the busy state in the current monitoring period may be determined by subtracting the number of clock cycles where the operation unit 110 is in the idle state from the number of clock cycles in the current monitoring period, so as to obtain the load amount of the operation unit 110 in the current monitoring period.

Optionally, as another embodiment, the monitoring period counter module 121 may further receive configuration information sent by the system controller, where the configuration information is used for determining the number k of sub-periods in the current monitoring period. The system controller may flexibly configure the length of the current monitoring period according to the performance feature of the system, so the load amount state of the operation unit 110 can be monitored more accurately.

Optionally, as another embodiment, the load monitoring unit 130 may send load amount information in M monitoring periods to the system controller after recording the load amount information in the M monitoring periods, so that the system controller adjusts the working frequency of the operation unit 110 according to the load amount information in the M monitoring periods, where the load amount information in the M monitoring periods includes the load amount information in the current monitoring period, and M is a positive integer greater than 1.

After obtaining load amount information in continuous M monitoring periods, the load monitoring unit 130 may send the load amount information in the M monitoring periods once to the system controller. In this way, the system controller may obtain a change trend of the load amount of the operation unit 110, so as to adjust the working frequency of the operation unit 110 more accurately. Certainly, after obtaining, according to the performance feature of the operation unit, load amount information in discontinuous M monitoring periods, the load monitoring unit 130 may also send the load amount information in the discontinuous M monitoring periods once to the system controller, which is not limited in the embodiment of the present invention.

Optionally, as another embodiment, the load monitoring unit 130 may include M register modules. The M register modules may record the load amount information in the M monitoring periods. In this way, the change trend of the load amount of the operation unit 110 can be monitored.

In the embodiment of the present invention, the working state unit determines the load amount information in the current monitoring period according to the working state of each processing module in the operation unit, which, compared with the prior art in which the load amount is monitored through software, can accurately reflect the load amount state and reduce resource consumption.

In addition, in the embodiment of the present invention, the load monitoring unit sends the load amount information to the system controller, so that the system controller can adjust the working frequency of the operation unit according to the load amount state of the operation unit in the current monitoring period, thereby reducing dynamic power consumption of the operation unit.

Figure 3:
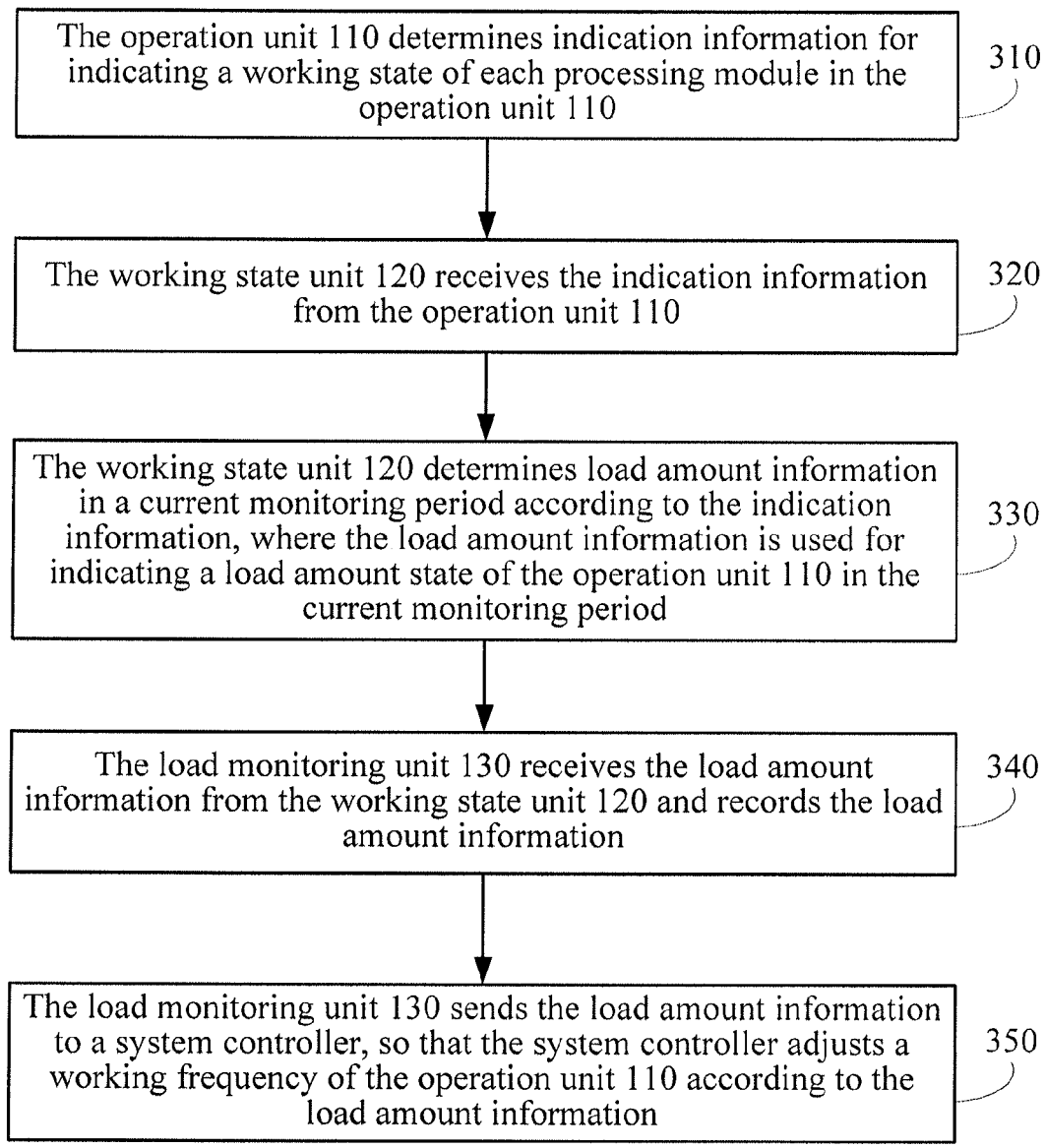
FIG. 3 is a schematic flow chart of a load monitoring method according to an embodiment of the present invention.

FIG. 3 is a schematic flow chart of a load monitoring method according to an embodiment of the present invention. The method in FIG. 3 is executed by the load monitoring apparatus 100 in FIG. 1. The method in FIG. 3 is described in the following in combination of the load monitoring apparatus 100 in FIG. 1, and repeated description is properly omitted.

310: The operation unit 110 determines indication information for indicating a working state of each processing module in the operation unit 110.

320: The working state unit 120 receives the indication information from the operation unit 110.

330: The working state unit 120 determines load amount information in a current monitoring period according to the indication information, where the load amount information is used for indicating a load amount state of the operation unit 110 in the current monitoring period.

340: The load monitoring unit 130 receives the load amount information from the working state unit 120 and records the load amount information.

350: The load monitoring unit 130 sends the load amount information to a system controller, so that the system controller adjusts a working frequency of the operation unit 110 according to the load amount information.

In the embodiment of the present invention, the working state unit determines the load amount information in the current monitoring period according to the working state of each processing module in the operation unit, which, compared with the prior art in which a load amount is monitored through software, can accurately reflect the load amount state and reduce resource consumption.

In addition, in the embodiment of the present invention, the load monitoring unit sends the load amount information to the system controller, so that the system controller can adjust the working frequency of the operation unit according to the load amount state of the operation unit in the current monitoring period, thereby reducing dynamic power consumption of the operation unit.

Optionally, as an embodiment, before step 320, the working state unit 120 may determine the number k of sub-periods in the current monitoring period and the number of clock cycles in the current monitoring period, where the current monitoring period is formed by k sub-periods, each sub-period has the same number of clock cycles, and k is a positive integer.

Optionally, as another embodiment, in step 330, the working state unit 120 may determine the load amount of the operation unit 110 in the current monitoring period according to the indication information, and determine the load amount information according to the load amount of the operation unit 110 in the current monitoring period and the number k of sub-periods in the current monitoring period, where the load amount information includes a load amount of the operation unit in a sub-period.

Optionally, as another embodiment, in step 330, the working state unit 120 may record the number of clock cycles where the operation unit 110 is in a busy state in the current monitoring period as the load amount of the operation unit 110 according to the indication information.

Optionally, as another embodiment, in step 330, the working state unit 120 may record the number of clock cycles where all processing modules are in an idle state in the current monitoring period as the number of clock cycles where the operation unit 110 is in the idle state; and determine the number of clock cycles where the operation unit 110 is in a busy state in the current monitoring period according to the number of clock cycles where the operation unit 110 is in the idle state in the current monitoring period and the number of clock cycles in the current monitoring period.

Optionally, as another embodiment, before step 320, the working state unit 120 may receive configuration information sent by the system controller, where the configuration information is used for determining the number k of sub-periods in the current monitoring period.

Optionally, as another embodiment, in step 350, the load monitoring unit 130 may send load amount information in M monitoring periods to the system controller after recording the load amount information in the M monitoring periods, so that the system controller adjusts the working frequency of the operation unit 110 according to the load amount information in the M monitoring periods, where the load amount information in the M monitoring periods may include the load amount information in the current monitoring period, and M is a positive integer.

Optionally, as another embodiment, before step 350, the load monitoring unit 130 may record load amount information in M monitoring periods.

In the embodiment of the present invention, the working state unit determines the load amount information in the current monitoring period according to the working state of each processing module in the operation unit, which, compared with the prior art in which the load amount is monitored through software, can accurately reflect the load amount state and reduce resource consumption.

In addition, in the embodiment of the present invention, the load monitoring unit sends the load amount information to the system controller, so that the system controller can adjust the working frequency of the operation unit according to the load amount state of the operation unit in the current monitoring period, thereby reducing dynamic power consumption of the operation unit.

Figure 5:
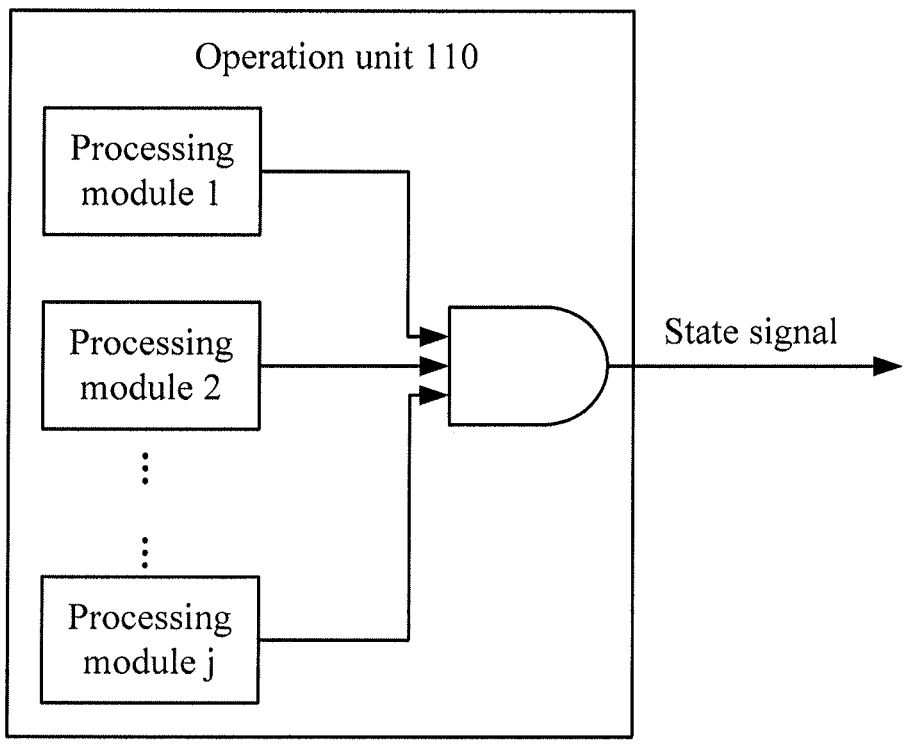
FIG. 5 is a schematic diagram of an example of an operation unit according to an embodiment of the present invention.
Figure 6:
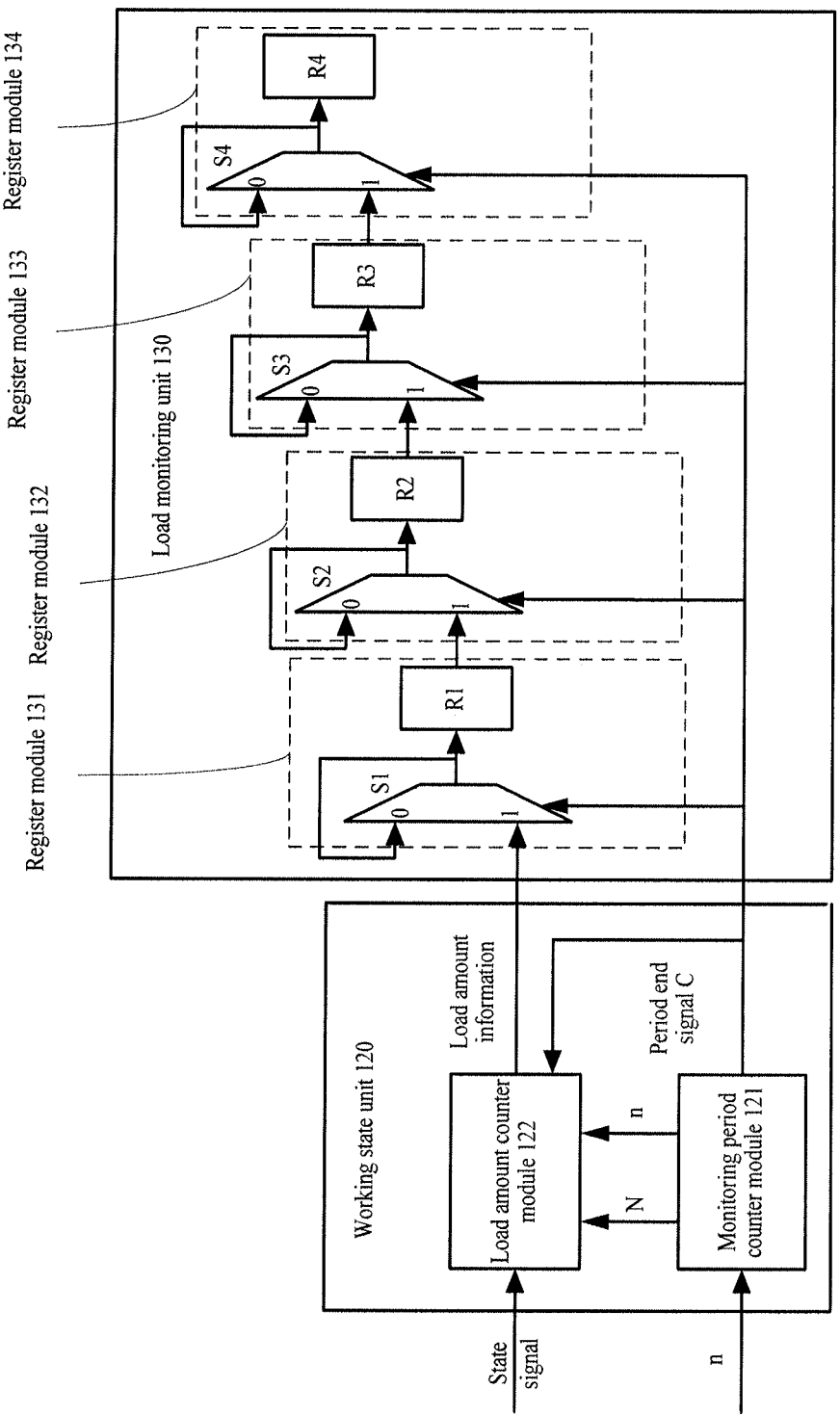
FIG. 6 is a schematic diagram of an example of a working state unit and a load monitoring unit according to an embodiment of the present invention.

The embodiments of the present invention are described in more detail in the following in combination of specific examples. It should be noted that, the examples in FIG. 4 to FIG. 6 are intended to help persons skilled in the art to better understand the embodiments of the present invention, instead of limiting the scope of the embodiments of the present invention.

Figure 4:
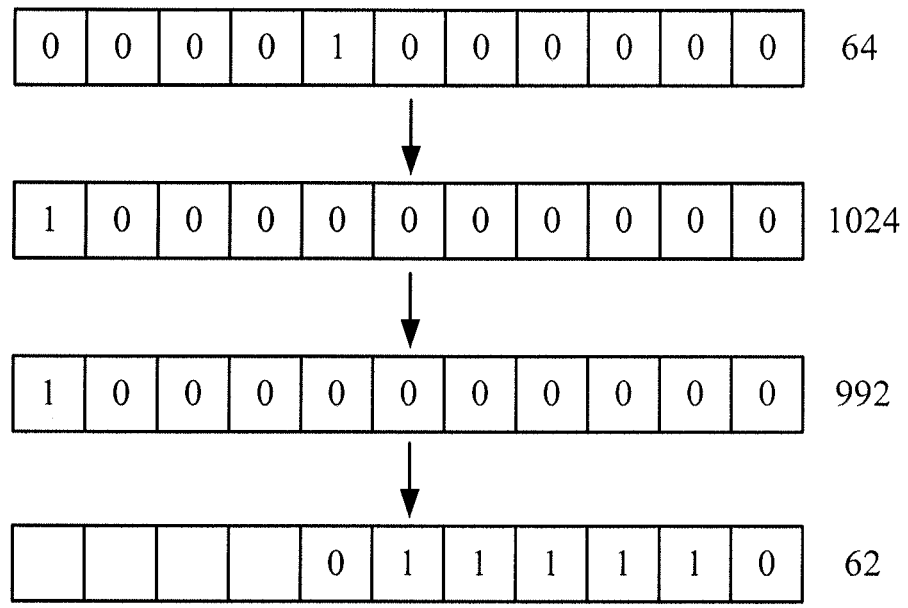
FIG. 4 is a schematic flow chart of an example of a process for determining a load amount according to an embodiment of the present invention.

FIG. 4 is a schematic flow chart of an example of a process for determining a load amount according to an embodiment of the present invention.

In FIG. 4, it is assumed that the number of clock cycles of each sub-period is 64, and the number of sub-periods in the current monitoring period is $k=2^n$, where n is assumed to be 4 here. The number 64 of clock cycles of the sub-period is converted into a binary number, namely, 7'b1000000 (7'd64). Because the current monitoring period is formed by $2^4$ sub-periods, the number 7'b1000000 of clock cycles of the sub-period is moved by 4 bits to the left, to obtain the number 11'b10000000000 (11'd1024) of clock cycles in the current monitoring period.

Assuming that in the 11'b10000000000 clock cycles, the number of clock cycles where the operation unit 110 is in the idle state is 32, the number of clock cycles where the operation unit 110 is in the busy state is 1024−32=992, which is 10'b1111100000 (10'd992) after being converted into a binary number. Because the current monitoring period is formed by $2^4$ sub-periods, the number 10'b1111100000 (10'd992) of clock cycles where the operation unit 110 is in the busy state in the current monitoring period is moved by 4 bits to the right, to obtain the number 6'b111110 (10'd62) of clock cycles where the operation unit 110 is in the busy state in a sub-period. That is, the load amount of the operation unit 110 in a sub-period is 62. Therefore, the load amount information includes the load amount 62 of the operation unit 110 in a sub-period.

It should be understood that, the foregoing value example is merely intended to help persons skilled in the art to better understand the embodiment of the present invention, instead of limiting the scope of the embodiment of the present invention.

In the embodiment of the present invention, the load amount of the operation unit in the current monitoring period is converted into the load amount of the operation unit in the sub-period, which can reduce the load amount information, thereby saving resources.

FIG. 5 is a schematic diagram of an example of an operation unit according to an embodiment of the present invention. FIG. 5 is described in the following in combination of the load monitoring apparatus 100 in the FIG. 1.

In FIG. 5, the operation unit 110 includes j processing modules, namely, a processing module 1 to a processing module j, where j is a positive integer.

As shown in FIG. 5, the working state of the operation unit 110 is jointly determined by the working state of each processing module. In a same clock cycle, when the processing module 1 to the processing module j are all in the idle state, the operation unit 110 is in the idle state, and a state signal outputs a high level.

In this way, the number of clock cycles where the operation unit 110 is in the idle state in the current monitoring period may be obtained by recording the number of clock cycles where the state signal outputs the high level in a monitoring period, so as to obtain the number of clock cycles where the operation unit 110 is in the busy state in the current monitoring period as the load amount of the operation unit 110 in the current monitoring period.

FIG. 6 is a schematic diagram of an example of a working state unit and a load monitoring unit according to an embodiment of the present invention. FIG. 6 is described in the following in combination of the load monitoring apparatus 100 in FIG. 1, and repeated description is properly omitted.

In FIG. 6, it is assumed that the load monitoring unit 130 may record load amount information of four monitoring periods. The foregoing value example is merely intended to help persons skilled in the art to better understand the embodiment of the present invention, instead of limiting the scope of the embodiment of the present invention. In the embodiment of the present invention, the load monitoring unit 130 may further record load amount information of monitoring periods in other numbers, which is not limited in the embodiment of the present invention.

As shown in FIG. 6, the working state unit 120 includes a monitoring period counter module 121 and a load amount counter module 122. The number of clock cycles in a monitoring period is expressed in N. Assuming that the number of sub-periods in a first monitoring period is $k=2^n$, the monitoring period counter module 121 may receive a value $n_0$ of n from a system controller. The number i of clock cycles in each sub-period is predefined, where i is a positive integer. Therefore, a value of the number N of clock cycles in the first monitoring period is $N_0=(i<<n_0)$.

An initial value of the monitoring period counter module 121 is $N_0$, from which 1 is subtracted in each clock cycle until the value is 0, which indicates that the first monitoring period ends. In this case, a period end signal C becomes the high level, which continues for a clock cycle.

The monitoring period counter module 121 may send the number $N_0$ of clock cycles in the first monitoring period and the value $n_0$ of n to the load amount counter module 122. An initial value of the load amount counter module 122 is also $N_0$. When a state signal received from the operation unit 110 shown in FIG. 5 is a high level, 1 is subtracted from a value of the load amount counter module 122. When the first monitoring period ends, and the period end signal C is the high level, a current value of the load amount counter module 122 is moved by $n_0$ bits to the right, to obtain a load amount of the operation unit 110 in a sub-period in the first monitoring period as load amount information $P_1$ in the first monitoring period, and the load amount information $P_1$ in the first monitoring period is sent to the load monitoring unit 130.

After the first monitoring period ends, the monitoring period counter module 121 may receive a value $n_1$ of n from the system controller again, and determine a value $N_1 = (i<<n_1)$ of the number N of clock cycles in a second monitoring period, and send the number $N_1$ of clock cycles in the second monitoring period and the value $n_1$ of n to the load amount counter module 122. Reference may be made to the process of the first monitoring period for a specific working process, which is not repeatedly described here to avoid repeated description.

After four monitoring periods end, the load amount counter module 122 may send load amount information in the four monitoring periods once to the load monitoring unit 130, namely, the load amount information $P_1$ in the first monitoring period, the load amount information $P_2$ in the second monitoring period, load amount information $P_3$ in a third monitoring period, and load amount information $P_4$ in a fourth monitoring period.

In FIG. 6, the load monitoring unit 130 includes 4 register modules 131, 132, 133, and 134, where each register module may record load amount information in 1 monitoring period. The register module 131 includes a selector S1 and a register R1. The register module 132 includes a selector S2 and a register R2. The register module 133 includes a selector S3 and a register R3. The register module 134 includes a selector S4 and a register R4.

When the first monitoring period ends, the period end signal C becomes the high level, the load monitoring unit 130 receives the load amount information $P_1$ in the first monitoring period from the load amount counter module 122, and records the load amount information $P_1$ in the register module 131. When the second monitoring period ends, the load monitoring unit 130 receives the load amount information $P_2$ in the second monitoring period from the load amount counter module 122, and records the load amount information $P_2$ in the register module 131, and exports the load amount information $P_1$ in the first monitoring period from the register module 131 to the register module 132. The rest may be deduced by analogy, and after the four monitoring periods end, the register module 131 records the load amount information $P_4$ in the fourth monitoring period, the register module 132 records the load amount information $P_3$ in the third monitoring period, the register module 133 records the load amount information $P_2$ in the second monitoring period, and the register module 134 records the load amount information $P_1$ in the first monitoring period.

In this way, the load monitoring unit 130 may send the load amount information of the four monitoring periods once to the system controller, so that the system controller may obtain a change trend of the load amount of the operation unit 110, thereby adjusting the working frequency of the operation unit 110 more accurately.

Persons of ordinary skill in the art may be aware that, units and algorithm steps of the examples described in combination with the embodiments disclosed in this specification can be implemented by electronic hardware, or a combination of computer software and electronic hardware. Whether these functions are performed by hardware or software depends on particular applications and design constraint conditions of the technical solutions. Persons skilled in the art may use different methods to implement the described functions for each particular application, but it should not be considered that the implementation goes beyond the scope of the present invention.

Persons skilled in the art may clearly understood that, for the purpose of convenient and brief description, for a detailed working process of the foregoing system, apparatus, and unit, reference may be made to a corresponding process in the foregoing method embodiments, and details are not repeatedly described here.

In the several embodiments provided in the present application, it should be understood that the disclosed system, apparatus, and method may be implemented in other manners. For example, the described apparatus embodiment is merely exemplary. For example, dividing of the units is merely a kind of logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be electronic, mechanical or in other forms.

The units described as separate parts may or may not be physically separate, and parts displayed as units may or may not be physical units, may be located in one position, or may also be distributed on a plurality of network units. Part or all of the units may be selected according to the actual needs to achieve the objectives of the solutions of the embodiments.

In addition, functional units in the embodiments of the present invention may be integrated into a processing unit, each of the units may also exist alone physically, and two or more units may also be integrated into a unit.

When the functions are implemented in the form of a software functional unit and sold or used as an independent product, the functions may be stored in a computer readable storage medium. Based on such understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, or the like) to perform all or part of the steps of the method described in the embodiments of the present invention. The storage medium includes: any medium that is capable of storing program codes, such as a U disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement that may be easily derived by persons skilled in the art within the technical scope disclosed in the present invention shall fall within the protection scope of the present invention. Therefore, the protection scope of the present invention shall be subject to the protection scope of the claims.

What is claimed is:

1. A load monitoring apparatus, comprising:
an operation unit, configured to determine indication information for indicating a working state of each processing module in the operation unit;
a working state unit, comprising a hardware counter, the working unit configured to receive the indication information from the operation unit, and determine load amount information in a current monitoring period according to the indication information, wherein the load amount information indicates a load amount state as a number of idle states of the operation unit in the current monitoring period; and
a load monitoring unit, configured to receive the load amount information from the working state unit and record the load amount information, and send the load amount information to a system controller, so that the system controller adjusts a working frequency of the operation unit according to the load amount information, wherein the adjusting of the working frequency of the operation unit comprises the operation unit operates at a clock frequency having clock cycles being reduced by a same number of idle states indicated in the load amount information.

2. The apparatus according to claim 1, wherein the working state unit comprises:
a monitoring period hardware counter, configured to determine number k of sub-periods in the current monitoring period and number of clock cycles in the current monitoring period, wherein the current monitoring period is formed by k sub-periods, each sub-period has the same number of clock cycles, and k is a positive integer.

3. The apparatus according to claim 2, wherein the working state unit further comprises:
a load amount hardware counter, configured to determine a load amount of the operation unit in the current monitoring period according to the indication information; and determine the load amount information according to the number k which is of sub-periods in the current monitoring period and is received from the monitoring period counter module and the load amount of the operation unit in the current monitoring period, wherein the load amount information comprises a load amount of the operation unit in one of the sub-periods.

4. The apparatus according to claim 3, wherein the load amount hardware counter is specifically configured to record, according to the indication information, the number of clock cycles where the operation unit is in a busy state in the current monitoring period as the load amount of the operation unit.

5. The apparatus according to claim 4, wherein the load amount hardware counter is specifically configured to receive the number of clock cycles in the current monitoring period from the monitoring period hardware counter; record the number of clock cycles where all processing modules are in an idle state in the current monitoring period as the number of clock cycles where the operation unit is in the idle state; and determine the number of clock cycles where the operation unit is in the busy state in the current monitoring period according to the number of clock cycles where the operation unit is in the idle state in the current monitoring period and the number of clock cycles in the current monitoring period.

6. The apparatus according to claim 2, wherein the monitoring period hardware counter is further configured to receive configuration information sent by the system controller, and the configuration information is used for determining the number k of sub-periods in the current monitoring period.

7. The apparatus according to a claim 1, wherein the load monitoring unit is specifically configured to send load amount information in M monitoring periods to the system controller after recording the load amount information in the M monitoring periods, so that the system controller adjusts the working frequency of the operation unit according to the load amount information in the M monitoring periods, and the load amount information in the M monitoring periods comprises the load amount information in the current monitoring period, and M is a positive integer greater than 1.

8. The apparatus according to claim 7, wherein the load monitoring unit comprises M register modules, configured to record the load amount information in the M monitoring periods.

9. A load monitoring method, comprising:
determining, by an operation unit, indication information for indicating a working state of each processing module in the operation unit;
receiving, by a working state unit, the indication information from the operation unit;
determining, by the working state unit, load amount information in a current monitoring period according to the indication information, wherein the load amount information indicates a load amount state as a number of idle states of the operation unit in the current monitoring period;
receiving, by a load monitoring unit, the load amount information from the working state unit and recording the load amount information; and
sending, by the load monitoring unit, the load amount information to a system controller, so that the system controller adjusts a working frequency of the operation unit according to the load amount information, wherein the adjusting of the working frequency of the operation unit comprises the operation unit operates at a clock frequency having clock cycles being reduced by a same number of idle states indicated in the load amount information.

10. The method according to claim 9, further comprising:
determining, by the working state unit, number k of sub-periods in the current monitoring period and number of clock cycles in the current monitoring period, wherein the current monitoring period is formed by k sub-periods, each sub-period has the same number of clock cycles, and k is a positive integer.

11. The method according to claim 10, wherein the determining, by the working state unit, load amount information in a current monitoring period according to the indication information comprises:
determining, by the working state unit, a load amount of the operation unit in the current monitoring period according to the indication information; and
determining, by the working state unit, the load amount information according to the load amount of the operation unit in the current monitoring period and the number k of sub-periods in the current monitoring period, wherein the load amount information comprises a load amount of the operation unit in one of the sub-periods.

12. The method according to claim 11, wherein the determining, by the working state unit, a load amount of the operation unit in the current monitoring period according to the indication information comprises:
recording, by the working state unit and according to the indication information, the number of clock cycles where the operation unit is in a busy state in the current monitoring period as the load amount of the operation unit.

13. The method according to claim 12, wherein the recording, by the working state unit and according to the indication information, the number of clock cycles where the operation unit is in a busy state in the current monitoring period as the load amount of the operation unit comprises:
recording, by the working state unit, the number of clock cycles where all processing modules are in an idle state in the current monitoring period as the number of clock cycles where the operation unit is in the idle state; and
determining, by the working state unit, the number of clock cycles where the operation unit is in the busy state in the current monitoring period according to the number of clock cycles where the operation unit is in the idle state in the current monitoring period and the number of clock cycles in the current monitoring period.

14. The method according to claim 10, further comprising:
receiving, by the working state unit, configuration information sent by the system controller, wherein the configuration information is used for determining the number k of sub-periods in the current monitoring period.

15. The method according to claim 9, wherein the sending, by the load monitoring unit, the load amount information to the system controller comprises:
sending, by the load monitoring unit, load amount information in M monitoring periods to the system controller after recording the load amount information in the M monitoring periods, so that the system controller adjusts the working frequency of the operation unit according to the load amount information in the M monitoring periods, wherein the load amount information in the M monitoring periods comprises the load amount information in the current monitoring period, and M is a positive integer greater than 1.

16. The method according to claim 15, further comprising:
recording, by the load monitoring unit, the load amount information in the M monitoring periods.

\* \* \* \* \*